United States Patent

Kelly et al.

Patent Number: 5,976,685
Date of Patent: Nov. 2, 1999

[54] FOAM-FABRIC LAMINATE FOR A CUSHION ASSEMBLY

[75] Inventors: David J. Kelly, Chadds Ford; Paul Haslanger, Swarthmore, both of Pa.

[73] Assignee: Foamex L.P., Linwood, Pa.

[21] Appl. No.: 09/218,525

[22] Filed: Dec. 22, 1998

Related U.S. Application Data

[62] Division of application No. 08/730,969, Oct. 16, 1996, Pat. No. 5,891,293.

[51] Int. Cl.⁶ .................. B32B 5/22; B32B 7/12
[52] U.S. Cl. .............. 428/308.4; 267/142; 267/146; 428/220; 428/317.1; 428/317.7; 442/226; 442/374
[58] Field of Search .................. 428/220, 308.4, 428/317.1, 317.7; 267/142, 146; 442/226, 374

[56] References Cited

U.S. PATENT DOCUMENTS

| | | |
|---|---|---|
| 3,649,077 | 3/1972 | Flint . |
| 4,692,199 | 9/1987 | Kozlowski et al. . |
| 4,853,054 | 8/1989 | Turner et al. ............... 156/78 |
| 4,931,483 | 6/1990 | Matsuoka et al. ............ 521/137 |
| 5,232,543 | 8/1993 | Frelich et al. . |
| 5,254,197 | 10/1993 | Klems . |
| 5,338,386 | 8/1994 | Frelich et al. . |
| 5,360,831 | 11/1994 | Lidy et al. ................... 521/99 |
| 5,506,278 | 4/1996 | Walmsley ................ 521/128 |
| 5,512,319 | 4/1996 | Cook ....................... 427/244 |
| 5,594,097 | 1/1997 | Chaffanjon et al. ......... 521/125 |
| 5,891,293 | 4/1999 | Kelly et al. ................ 156/285 |

Primary Examiner—Blaine Copenheaver
Attorney, Agent, or Firm—Connolly Bove Lodge & Hutz LLP

[57] ABSTRACT

A seat cushion assembly is formed by (a) placing a foam-fabric laminate (14, 15) and an air impervious adhesive film (16) over a mold (18); (b) drawing the adhesive against the foam and urging the fabric against the mold by vacuum; (c) placing a foam pad (12) adjacent to the adhesive film; (d) heating the film and diffusing it into the foam pad and into the foam of the foam-fabric laminate; and (e) curing the film adhesive. The foam layer laminated to the fabric is formed as the reaction product of a polyether polyol or a graft polyether polyol with about 30 to 60 parts by weight of an MDI or polymeric MDI/TDI blended isocyanate with the major portion MDI or mixtures thereof, about 1.5 to 3.0 parts by weight water as a blowing agent, about 0.05 to about 0.90 parts by weight amine catalyst and about 0.5 to about 1.5 parts by weight silicone surfactant, wherein all amounts are based on 100 parts by weight polyol.

8 Claims, 1 Drawing Sheet

5,976,685

FOAM-FABRIC LAMINATE FOR A CUSHION ASSEMBLY

CROSS-REFERENCE TO RELATED APPLICATION

This application is a divisional application from U.S. Ser. No. 08/730,969, filed Oct. 16, 1996, now U.S. Pat. No. 5,891,293.

BACKGROUND OF THE INVENTION

This invention relates to methods of bonding a fabric layer to a cellular foam layer to form a laminate that is then applied with adhesive to a pad of the type used for cushions, in particular for seating and back cushions in automotive seats.

Fabric covered foam articles, such as cushions, generally comprise a foam pad adhesively secured to a covering fabric. Lear Seating Corporation of Southfield, Mich. developed a particular bonding method that is described in U.S. Pat. No. 4,692,199, issued Sep. 8, 1987 to Kozlowski. In that method, vacuum pressure is applied to a porous contoured mold in order to draw an impervious adhesive film against a cloth fabric layer to conform the cloth fabric layer and adhesive to the contours of the inner mold surface. A matching cellular foam pad is placed in mating engagement with the adhesive film as it is held to the contour of the mold surface by vacuum pressure. The foam pad may then be compressed against the mold by a perforated platen and held in place. The vacuum may be discontinued. A heated fluid, preferably steam is supplied through the porous mold to heat and diffuse the adhesive film into the adjacent fabric layer and cellular foam pad, respectively, to adhesively secure the two together. Vacuum may then be applied to remove moisture from the fabric and foam by drawing air through the perforations in the platen and through the foam pad, fabric layer and porous mold.

Variations to this method of bonding fabric layers to cushions are disclosed in U.S. Pat. No. 5,232,543, issued Aug. 3, 1993 to Frelich, et al., and U.S. Pat. No. 5,338,386, issued Aug. 16, 1994 to Frelich, et al. These patents show a method and apparatus for bonding fabric to seat cushion trenches in which portions of a fabric bag may be bonded to the seat cushion, then manipulated to remove wrinkles before the rest of the fabric bag is bonded to the cushion.

In addition, U.S. Pat. No. 5,254,197, issued Oct. 19, 1993 to Klems, discloses another variation on the method and apparatus for adhesively bonding a fabric layer to cellular foam pad in which a heat sensitive adhesive is activated by microwave radiation.

For all applications in which a fabric is adhesively bonded to a cellular foam pad, and particularly for automotive seat cushions, the adhesive must securely bond the foam and fabric together. Incomplete bonding permits the foam cushion to settle and bunch and shift position relative to the fabric. This condition causes excessive wear on the fabric and on the cushion, and causes the fabric to crease or wrinkle. Creases and wrinkles not only have an unsightly appearance, but also present areas more susceptible to wear and tear.

Following development of the bonding method disclosed in Kozlowski (U.S. Pat. No. 4,692,199), it was found that bonding between the fabric and the cushion could be improved if a thin layer of cellular foam material was first flame laminated to the underside of the fabric. Then, following the known bonding method of Kozlowski, the foam-fabric laminate was attached to the cushion, such that the adhesive penetrated into the cellular foam of the foam-fabric laminate and into the core cushion.

Bond strength is a measure of the force per square inch required to separate the laminated fabric from the cellular foam pad. None of the prior patents set out above specify the bond strengths obtained. None of the prior patents specify the types of foam that are best suited for use as the cellular foam pad or as the foam layer used to form a laminate with the fabric prior to attachment to the cellular foam pad or cushion. Applicant has surprisingly found that consistently excellent bond strengths not heretofore achieved are obtained when a foam-fabric laminate is used in the bonding methods disclosed in these prior patents, wherein the foam layer of the foam-fabric laminate comprises certain polyurethane foams formed with a polymeric methylene diphenyl diisocyanate/toluene diisocyanate (MDI/TDI) blended isocyanate or a polymeric methylene diphenyl diisocyanate.

SUMMARY OF THE INVENTION

The invention is an improved cushion assembly. A foam-fabric laminate is formed by attaching a thin layer of foam to a fabric layer, preferably by flame-lamination or with an air-permeable adhesive. The foam-fabric laminate is placed over a mold surface and an air impervious adhesive film is next placed over all or a portion of the foam-fabric layer, adjacent to the foam. A vacuum applied over the mold surface and through the foam-fabric layer draws the adhesive film against the foam of the foam-fabric layer and urges the fabric layer against the mold surface. A cellular foam pad is next placed in facing engagement with the adhesive film. The adhesive film is then heated and diffused into the foam pad and into the foam layer of the foam-fabric laminate respectively. Once the diffused adhesive is cured, the foam-fabric laminate layer and the cellular foam pad are laminated or secured together. In preferred embodiments (1) the cellular foam pad is formed with a contoured surface that mates with or engages the contoured inner surface of the mold, (2) the foam pad is compressed into the adhesive, foam-fabric laminate and mold with a perforated platen, and (3) the mold is porous and a heated fluid, such as steam, is introduced into the mold and passed through the foam-fabric laminate and cellular foam pad to heat and diffuse the adhesive. The adhesive may be heated by other means as well, such as heating the outside of the mold, or introducing microwave radiation into the mold.

In the invention, the foam that is attached to the underside of the fabric is formed from the reaction product of a polyether polyol or a polyether graft polyol with from 30 to 60 parts by weight, preferably 40 to 50 parts by weight, of an isocyanate selected from the group consisting of polymeric MDI, polymeric MDI/TDI blends, and mixtures thereof, from 1.5 to 3.0 parts by weight of water as blowing agent, from 0.05 to 0.20 parts by weight, preferably 0.09 to 0.15 parts by weight, tin catalyst, from 0.15 to 0.90 parts by weight, preferably, 0.30 to 0.60 parts by weight, amine catalyst, and from 0.50 to 1.5 parts by weight, preferably 0.60 to 1.0 parts by weight, silicone surfactant. All parts by weight are based on 100 parts by weight polyol. The foam layer must have sufficient thickness to enable it to be flame-laminated to the fabric layer. The foam layer usually has a thickness between 3 to 7 millimeters, preferably about 5 millimeters.

The adhesive film preferably is a hydrophilic polyamide base film and usually has a thickness between about one and five mils. Adhesive films with flow melting points in the range between about 110° to 145° C. appear to work best.

The bonding method in which a foam-fabric laminate fabricated with foam from the specified foam-forming compositions is attached with adhesive to a cellular foam cushion forms cushion assemblies that have consistently superior bond strengths or laminate strengths over assemblies made under identical conditions and with the same method but using other foam types. The bond between the cellular foam cushion and the foam-fabric laminates disclosed herein consistently score bond strength ratings of 7 to 10, mostly 10. Such ratings equate to lamination or bond strengths of 3.0 pound-force per linear inch or greater.

DESCRIPTION OF THE PREFERRED EMBODIMENT

Figure 1:
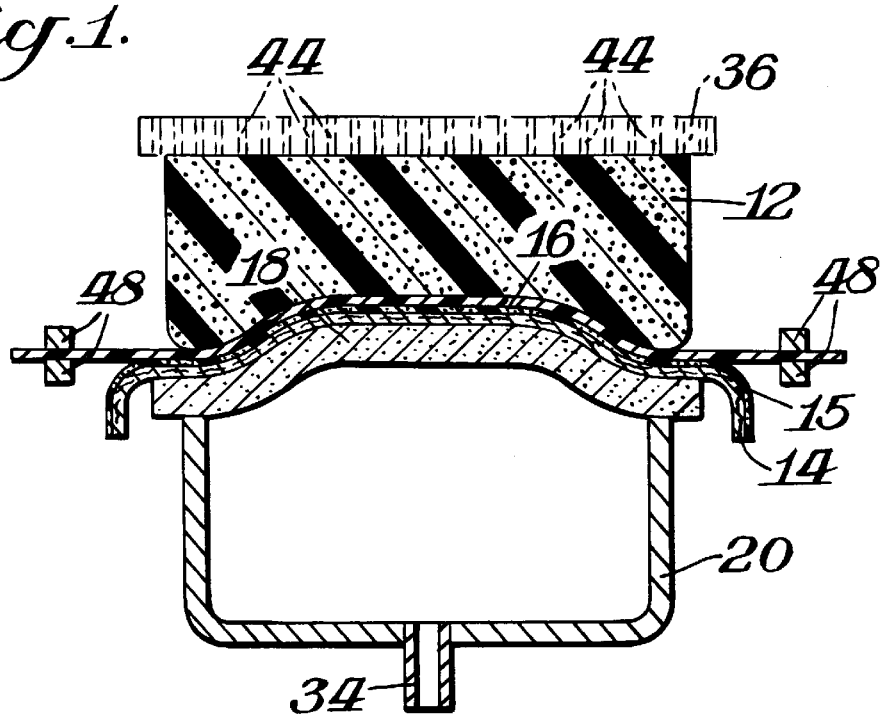
FIG. 1 is a schematic cross sectional view in side elevation of a mold showing the fabric layer, the thin foam layer, the adhesive film and the cellular foam cushion disposed over the mold and an optional perforated platen compressing the foam-fabric laminate, film and foam cushion against the mold surface.

The preferred embodiment of the invention is illustrated by referring to FIG. 1, which is a schematic of a representative mold apparatus that may be used with the invention. FIG. 1 is nearly identical to FIG. 6 from U.S. Pat. No. 4,692,199 (Kozlowski, et al.) and the reference numbers refer to like parts and elements from the Kozlowski, et al. patent. The disclosure of U.S. Pat. No. 4,692,199 is incorporated herein by reference.

In FIG. 1, the apparatus includes a porous mold 18 that has a contoured upper mold surface. Passages through the contoured part of the mold establish fluid communication with the passages in the mold.

A vacuum means (not shown) supplies a vacuum through the porous passages in the mold to its upper surface. A heating means (not shown) supplies heated fluid, such as steam, through conduit 34 to housing 20 and through the porous passages in the mold 18.

Optionally a platen means or pressing fixture 36 suspended for vertical movement relative to the mold 18 may be provided to compress the cellular foam pad 12, impervious adhesive film 16, and foam fabric laminate 14, 15, which comprises foam sheet 15 that has been previously flame laminated to porous fabric layer 14, against the mold 18. The platen 36 includes perforations or passages 44 extending therethrough in response to a vacuum applied to the mold surface to draw air through the foam pad 12 and platen 36.

The apparatus may include appropriate clamp means 48 for clamping the periphery of the adhesive film 16 against the underlying foam-fabric laminate layer 14, 15 and over the mold 18. The clamping means 48 may be a frame the extends in spaced relationship around the mold periphery or it may be a series of slip rings or clamps.

The invention is an improved method of forming a cellular foam pad laminated to a fabric in which the use of certain polyurethane foams are attached (such as by flame lamination or air permeable adhesive) to the fabric and that laminate is in turn attached with adhesive to the cellular cushion to form the seat cushion structures with consistently high bond strength ratings and high bond or lamination strength measurements. In the method a thin sheet of foam 15 is attached to a cloth fabric layer 14. Preferably, the foam is flame-laminated to the fabric layer. The foam sheet should have a thickness to enable it to be flame-laminated to a fabric layer. Typically the foam layer thickness will be in the range between about 3 to 7 millimeters, preferably about 5 millimeters. The fabric or cloth layer may be any suitable fabric used in furniture or automotive seat cushion assemblies. The foam-fabric laminate is then placed over a mold surface of a mold 18, with the fabric layer adjacent to the mold surface.

Next an air impervious adhesive film or sheet 16 is placed over the foam-fabric laminate 14, 15, adjacent to the foam layer 15. The adhesive film 16 is thin, having a thickness usually in the range of about one to five mils. Before activated, the adhesive film feels like a single layer of a plastic trash bag. Preferred materials for the adhesive film are hydrophilic polyamide base films with flow melting temperatures in the range of between 110° C. and 145° C., preferably 100° C. to 130° C. The adhesive film could also be a polyester used with hot air.

The periphery of the adhesive film is clamped by clamping means 48 against the underlying foam-fabric layer 14, 15 and over the mold 18. Alternatively, the film 16 may be draped over the foam-fabric layer 14, 15 and held in place adjacent the foam 15.

Vacuum applied through the housing 20 and through the porous mold 18 to the mold surface and through the foam-fabric layer 14, 15 acts or reacts with the air impervious adhesive film 16 down against the foam 15 of the foam-fabric layer 14, 15. In turn, the film urges the foam-fabric layer against the mold 18.

A cellular foam pad 12 is disposed in facing engagement with the adhesive film 16. Usually the mold 18 has a contoured mold surface with ribs or grooves and the preformed foam pad 12 will have an oppositely contoured surface. Thus, the foam pad 12 may be moved over the adhesive film 16 and into mating engagement with the contour presented by the mold 18. The optional platen 36 is then moved downwardly to engage and compress the foam pad 12 against the adhesive film 16, the foam-fabric layer 14, 15 and ultimately the mold 18. Once the platen has compressed the foam pad 12, the vacuum may be discontinued.

With the foam pad 12 held in position, the adhesive film 16 is heated and diffused into the foam pad 12 and the foam of the foam-fabric layer 14, 15 to laminate them together. Heating may be accomplished by passing steam through the porous mold 18 and foam-fabric layer 14, 15 to the adhesive film 16. Once the adhesive has diffused, it will allow air to pass through the foam-fabric layer 14, 15 and the foam pad 12. Heating or the supply of steam is discontinued. The moisture residue from the steam may then be removed by applying a vacuum over the mold surface. Air is drawn through the passages 44 in the platen 36, through the foam pad 12, through the foam-fabric layer 14, 15 and through the mold 18 to cool and cure the adhesive before the platen 36 is removed.

According to the invention, improved bonds are obtained if the foam layer 15 is formed from a foam that is the reaction product of a polyether polyol or a polyether graft polyol or a mixture of such polyols, with from 30 to 60 parts by weight, preferably 40 to 50 parts by weight, of an isocyanate selected from the group consisting of polymeric MDI, polymeric MDI/TDI blends, and mixtures thereof, from 1.5 to 3.0 parts by weight water as blowing agent, from 0.05 to 0.20 parts by weight, preferably 0.09 to 0.15 parts by weight, tin catalyst, from 0.15 to 0.9 parts by weight, preferably 0.30 to 0.60 parts by weight amine catalyst, and from 0.50 to 1.5 parts by weight, preferably 0.6 to 1.0 parts by weight silicone surfactant. All parts by weight are based on 100 parts by weight polyol.

Polyols are generally categorized as polyether polyols or polyester polyols. Polyether polyols are conventionally oxides, such as ethylene oxide or propylene oxide, polymerized onto an active hydrogen compound such as ethylene glycol, propylene glycol, glycerol and so forth. Polyester polyols are conventionally polycondensation products of polyhydric acids, such as adipic acid, maleic acid or phathalic acid, with polyhydroxy compounds, such as ethylene glycol, propylene glycol, glycerol and so forth. The polyol used to form the foam layer of the fabric-foam laminate of the invention preferably is a mixture of a polyether polyol and a polyether graft polyol, such as a 3000 molecular weight polyether triol sold by Dow Chemical under the tradename VORANOL 3010 and 1103 polyether graft polyol sold by BASF.

The isocyanate may be polymeric MDI or a polymeric MDI/TDI blend with a functionality between 2.1 and 2.7. If used in the invention, polymeric MDI/TDI blends should contain from 60 to 99% polymeric MDI. Suitable isocyanates include MDI 236, a proprietary polymeric MDI/TDI blend offered by BASF.

The tin and amine catalysts are catalysts that cause reaction between the polyol and the selected isocyanate for forming the foam. Suitable tin catalysts include T-9 and T-12 offered by Air Products and Chemicals Inc. and C-2 offered by Witco Corp., or mixtures of such catalysts. Suitable amine catalysts include Texcat ZF26 offered by Huntsman Corp. or C124 offered by Air Products and Chemicals Inc.

The silicone surfactant is selected to stablize the foam and control the pore size and foam cell structure formed when an MDI or MDI/TDI blend is used. Suitable silicone surfactants include L618 and L620 offered by OSi Specialties.

Optional additional ingredients in the foam-forming mixture include pigments, dyes, fire retardants, antimicrobial additives, antioxidants, fillers, and extenders.

When making the foam for the foam-fabric laminate, the foam-forming ingredients were metered to and blended in a conventional mixing head for foamable polyurethane reaction mixtures. The blended reaction mixture was fed to a conveyor mold where the mixture was permitted to foam and solidify to form a block or bun. Standard foam-forming equipment, such as Periphlex or Maxfoam foaming equipment, may be used. Layers of desired thickness (i.e., about 2 to 7 millimeters) are then slit, scibed, cut or shaved from the thick foam block or bun so produced.

Foams for the foam layer of the foam-fabric laminate used in the processes to form seat cushions should have a foam density in the range of 2 to 4 pounds per cubic foot, preferably 3.0 pounds per cubic foot, and an internal force deflection $IFD_{25}$ of from 60 to 150, preferably 80 to 120. The IFD of a foam is measured by the Indentation Force Deflection Test and the "$IFD_{25}$" numbers indicated above are "rest" values. That is, the force needed to compress the foam sample 25% of its initial thickness after being held in that position for one minute. The loading platen that is used in the test has a circular area of 50 $in^2$.

EXAMPLES

Foams formed from various compositions were flame laminated to nylon automotive fabric. These foam-fabric laminates were in turn bonded to cellular foam automotive seat cushions with a diffusible curing polyamide adhesive having a flow melting temperature below about 145° C. The laminate, adhesive and foam seat cushion were placed in a mold as shown in FIG. 1. The foam-forming components and their amounts are set out in Table 1. The identical fabric and identical adhesive were used for all examples.

Figure 2:
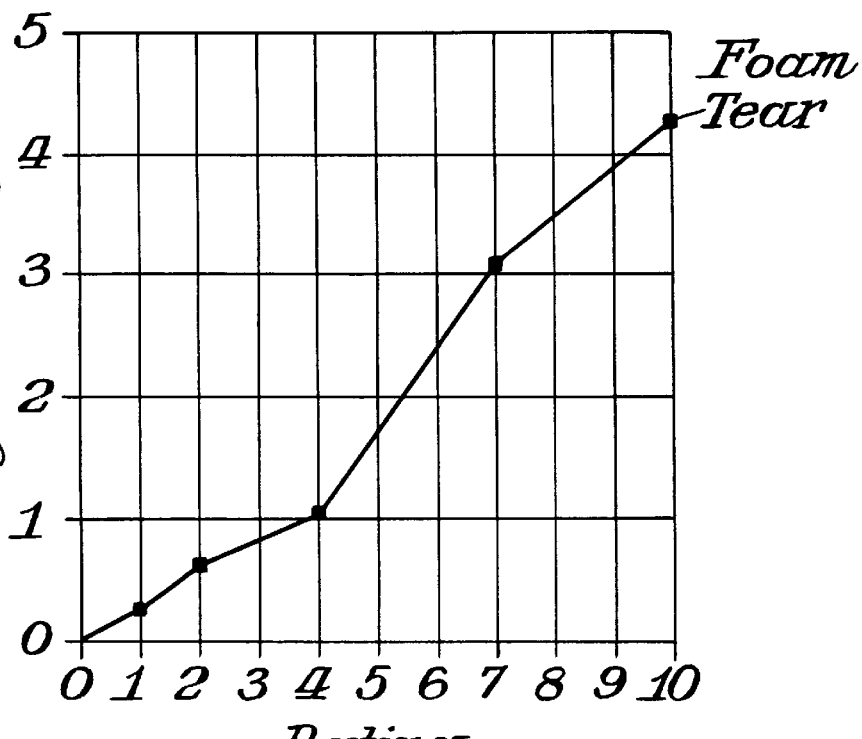
FIG. 2 is a graph correlating bond strength ratings on a scale from 1 to 10 to bond strength measurements.

After the seat cushions were so formed and the adhesive allowed to cool and cure for at least 24 hours, bond strength was measured using the following procedure. First a 4.5×1 inch sample was cut from the laminate product and placed in a Zwick 1435 Universal test machine. A gradually increasing pulling force measured in pounds, was applied to separate the foam-fabric laminate from the foam cushion. Lamination strength was rated on a scale from 1 to 10, with 1 being very poor and 10 being excellent. Where the laminate strength exceeded the tear strength of the foam, such that the foam began to tear but the adhesive bond did not, the lamination strength was given a rating of 10 and measured greater than 3.1 pounds-force per linear inch. Where the foam-fabric laminate was easily peeled apart from the foam cushion, the lamination strength received a rating of 1 and measured 0.3 pounds-force per inch or less. FIG. 2 correlates the ratings and lamination strengths of several fabric/foam adhesive assemblies tested. Foam-fabric laminate to foam cushion bonds with ratings of 7 or above exhibit the desired characteristics required for automotive chair seat assemblies.

Example C1 is a comparison example using one conventional TDI-based foam heretofore used in the foam-fabric laminate for automotive seat cushion assemblies. Examples 1 and 2 use MDI-based foams according to the invention.

Various modifications will be apparent to those skilled in the art without departing from the scope and spirit of this invention. Accordingly, the scope of the claims that follow are not to be limited by the examples set forth above. The claims should be construed as encompassing in the invention all features that would be treated as equivalents by those of skill in the art to which the invention pertains.

TABLE 1

FOAM FORMULATIONS AND BONDING STRENGTH

| COMPONENT | DESCRIPTION | C1 | 1 | 2 |
|---|---|---|---|---|
| 3137 | polyol | 10.0 | — | — |
| 3010 | polyol | — | 45.0 | 20.0 |
| 1103 | polyol | 90.0 | 55.0 | 80.0 |
| TD80 | TDI | 31.8 | — | — |
| MDI 236 | MDI/TDI blend | — | 45.6 | 44.8 |
| Isocyanate Index | | 125 | 107 | 110 |
| Water (total) | | 2.1 | 2.4 | 2.4 |
| DC5160 | silicone surfactant | 0.75 | — | — |
| L618 | silicone surfactant | — | 0.75 | 0.75 |
| T-9/C-2 | tin catalyst | 0.1 | 0.02 | 0.018 |
| T-12 | tin catalyst | — | 0.12 | 0.12 |
| Dabco R8020 | amine catalyst | 0.13 | — | — |
| A127 | amine catalyst | 0.30 | — | — |
| Texcat ZF26 | amine catalyst | — | 0.45 | 0.41 |
| DE60F | fire retardant | 12.0 | — | — |
| Antiblaze 195 | fire retardant | — | 10.0 | 10.0 |
| X40 black | dye | 1.0 | — | — |
| 33-88033 black | pigment | 2.0 | — | — |
| X3LV blue | dye | — | 1.03 | 1.03 |
| X38 orange | dye | — | 0.84 | 0.84 |
| X80 violet | dye | — | 0.13 | 0.13 |
| Foaming Density | $lbs/ft^3$ | 3.0 | 3.0 | 3.0 |
| $IFD_{25}$ | $lbs/50\ in.^2$ | 115 | 90 | 115 |
| Bond Strength | Rating 10 = Excellent 1 = Poor | 3 | 10 | 10 |

We claim:

1. A seat cushion assembly made according to the method comprising the steps of:

(a) attaching a foam layer to a fabric layer to form a foam-fabric laminate;
(b) placing the foam-fabric laminate over a mold surface of a mold with the fabric layer adjacent the mold surface;
(c) placing an air impervious adhesive film over the foam-fabric laminate with the adhesive film adjacent the foam layer of the foam-fabric laminate;
(d) applying a vacuum pressure over the mold surface and through the foam-fabric laminate, to draw the adhesive film against the foam layer and to urge the foam-fabric laminate against the mold surface;
(e) placing a cellular foam pad in facing engagement with the adhesive film;
(f) heating and diffusing the adhesive into the foam pad and foam layer of the foam-fabric laminate respectively; and
(g) curing the diffused adhesive to secure the foam-fabric laminate to the foam pad; wherein the foam layer is formed from a foam with an $IFD_{25}$ of from 60 to 150 pounds that is a reaction product of a polyether polyol or a polyether graft polyol, with from 30 to 60 parts by weight, based on 100 parts by weight polyol, of an isocyanate selected from the group consisting of polymeric methylene diphenyl diisocyanate, methylene diphenyl diisocyanate/toluene diisocyanate blends having from about 60 to about 99% methylene diphenyl diisocyanate, and mixtures thereof, from 1.5 to 3.0 parts by weight, based on 100 parts by weight polyol, of water as blowing agent, from 0.05 to 0.20 parts by weight, base on 100 parts by weight polyol, of a tin catalyst, from 0.15 to 0.90 parts by weight, based on 100 parts by weight polyol, of an amine catalyst, and from 0.5 to 1.5 parts by weight, based on 100 parts by weight polyol, of a silicone surfactant.

2. The seat cushion assembly of claim 1, wherein an additive selected from the group consisting of fire retardants, pigments, dyes, fillers, extenders, anti-microbial additives, antioxidants, and mixtures thereof, is added prior to forming the reaction product for the foam layer of the foam-fabric laminate.

3. The seat cushion assembly of claim 1, wherein a heated fluid is supplied over the mold surface to melt and diffuse the adhesive film into the foam pad and foam layer of the foam-fabric laminate respectively.

4. The seat cushion assembly of claim 1, wherein the mold is porous and the heated fluid diffuses through the porous mold to the mold surface.

5. The seat cushion assembly of claim 1, wherein the foam layer of the foam-fabric laminate has a thickness of about 3 to 7 millimeters.

6. The seat cushion assembly of claim 1, wherein the adhesive film is a hydrophilic polyamide base film.

7. The seat cushion assembly of claim 1, wherein the uncured adhesive film has a thickness between about one and five mils.

8. The seat cushion assembly of claim 1, wherein the foam fabric laminate is bonded to the cushion such that bond has a bond strength of at least 3.0 pound-force per linear inch.

* * * * *